United States Patent
Grover

(10) Patent No.: US 8,722,010 B1
(45) Date of Patent: May 13, 2014

(54) COPRODUCTION OF OXYGEN, HYDROGEN, AND NITROGEN USING ION TRANSPORT MEMBRANES

(71) Applicant: L'Air Liquide Societe Anonyme pour l'Etude et l'Expoitation des Procedes Georges Claude, Paris (FR)

(72) Inventor: Bhadra S. Grover, Sugar Land, TX (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/713,646

(22) Filed: Dec. 13, 2012

(51) Int. Cl.
- *C01B 31/20* (2006.01)
- *C01B 3/24* (2006.01)
- *C01B 13/02* (2006.01)
- *C01B 21/04* (2006.01)
- *C01B 3/26* (2006.01)

(52) U.S. Cl.
USPC ........ 423/650; 252/373; 423/351; 423/437.1; 423/579; 423/651; 423/652

(58) Field of Classification Search
USPC ........ 252/373; 423/351, 437.1, 579, 650–654
See application file for complete search history.

(56) References Cited

U.S. PATENT DOCUMENTS

| | | | | |
|---|---|---|---|---|
| 5,035,726 | A * | 7/1991 | Chen et al. | 95/54 |
| 6,066,307 | A * | 5/2000 | Keskar et al. | 423/648.1 |
| 6,077,323 | A * | 6/2000 | Nataraj et al. | 48/198.1 |
| 6,695,983 | B2 * | 2/2004 | Prasad et al. | 252/373 |
| 7,427,368 | B2 * | 9/2008 | Drnevich | 252/373 |
| 8,287,762 | B2 * | 10/2012 | Repasky | 252/373 |
| 2002/0127177 | A1 * | 9/2002 | Gottzmann et al. | 423/650 |
| 2011/0085967 | A1 * | 4/2011 | Raybold et al. | 423/652 |

* cited by examiner

*Primary Examiner* — Wayne Langel
(74) *Attorney, Agent, or Firm* — Elwood L. Haynes

(57) ABSTRACT

A method for the coproduction of oxygen, hydrogen and nitrogen using an ion transport membrane is provided. This method includes separating a compressed, hot air stream in an ion transport membrane, thereby producing a product oxygen stream and a hot nitrogen rich stream; utilizing at least a portion of the hot nitrogen rich stream as a heat source for reforming a hydrocarbons stream, thereby producing a syngas stream and a warm product nitrogen stream; and separating the syngas stream into a product hydrogen stream and a carbon dioxide rich stream.

7 Claims, 4 Drawing Sheets

COPRODUCTION OF OXYGEN, HYDROGEN, AND NITROGEN USING ION TRANSPORT MEMBRANES

BACKGROUND

Ion transport membranes (ITMs) consist of ionic and mixed-conducting ceramic oxides that conduct oxygen ions at elevated temperatures of 1475-1650 F. Air is compressed to about 230 psia, heated to 1650 F, and fed to ITM. Hot oxygen permeates through the membranes. The permeate pressure has to be kept low to provide oxygen partial pressure driving force across the membrane. Typically, 50% to 80% oxygen recovery seems possible.

SUMMARY

A method for the coproduction of oxygen, hydrogen and nitrogen using an ion transport membrane is provided. This method includes separating a compressed, hot air stream in an ion transport membrane, thereby producing a product oxygen stream and a hot nitrogen rich stream; utilizing at least a portion of the hot nitrogen rich stream as a heat source for reforming a hydrocarbons stream, thereby producing a syngas stream and a warm product nitrogen stream; and separating the syngas stream into a product hydrogen stream and a carbon dioxide rich stream.

In another embodiment, the method includes separating a compressed, hot air stream in an ion transport membrane, thereby producing a hot product oxygen stream and a nitrogen rich product stream; utilizing at least a portion of the hot oxygen product stream as a heat source for reforming a hydrocarbons stream, thereby producing a syngas stream; and separating the syngas stream into a product hydrogen stream and a carbon dioxide rich stream.

In another embodiment, the method includes separating at least a portion of a compressed, hot air stream in a first ion transport membrane, thereby producing a product oxygen stream and a first hot nitrogen rich stream; introducing at least a portion of the compressed, hot air stream and a first hydrocarbon stream into a second ion transport membrane reactor, thereby producing a first syngas stream and a second hot nitrogen rich stream, combining the first hot nitrogen stream and the second hot nitrogen stream into a product nitrogen stream; introducing the first syngas stream and a second hydrocarbon stream into a syngas reformer, thereby producing a second syngas stream; and separating the second syngas stream into a product hydrogen stream and a carbon dioxide rich stream.

In another embodiment, the method includes introducing a first hydrocarbon stream and a first steam stream into an exchange reformer, thereby producing a first syngas stream, separating at least a portion of a compressed, hot air stream in a first ion transport membrane, thereby producing a product oxygen stream and a first hot nitrogen rich stream; introducing at least a portion of the compressed, hot air stream and the first syngas stream into a second ion transport membrane reactor, thereby producing a second syngas stream and a second hot nitrogen rich stream, combining the first hot nitrogen stream and the second hot nitrogen stream into a product nitrogen stream; and separating the second syngas stream into a product hydrogen stream and a carbon dioxide rich stream.

DESCRIPTION OF PREFERRED EMBODIMENTS

Figure 1:
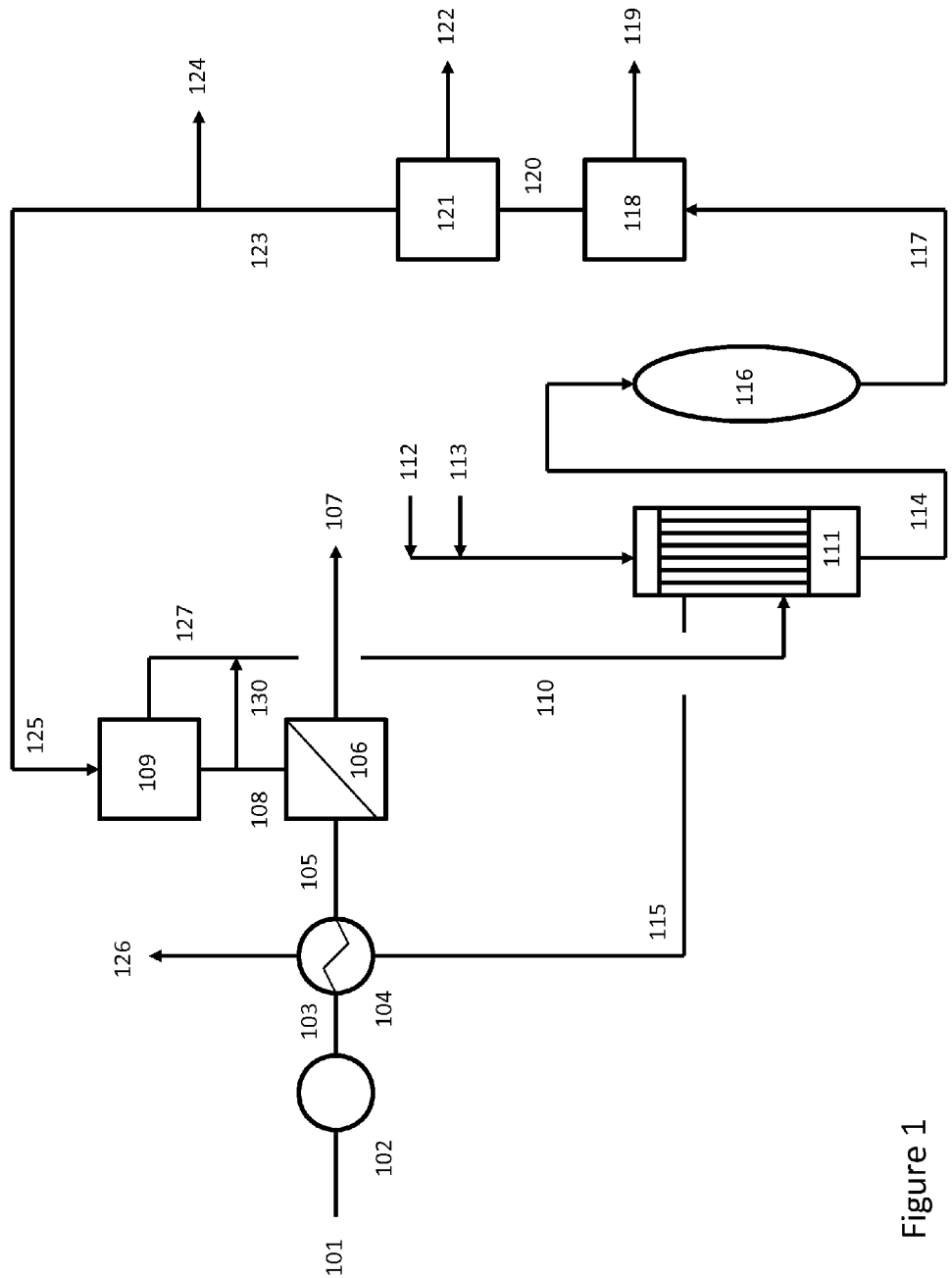
FIG. 1 is a schematic representation of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

To reduce the compression requirements for oxygen, a multi-stage membrane system is provided. The oxygen is withdrawn at successively reduced pressure.

Turning to FIG. 1, air stream 101 is compressed in compressor 102, thereby producing compressed stream 103. Compressed stream 103 is then heated by indirect heat exchange with purified nitrogen stream 115 in heat exchanger 104, thereby producing compressed, heated air stream 105. Heated air stream 105 may have a temperature of between 800-1000 C. Heated air stream 105 is introduced into ion transport membrane (ITM) 106, wherein oxygen product stream 107 and hot nitrogen rich stream 108 are formed. Oxygen product stream 107 may be at a pressure of between about 0.5 and 2.0 barA. Oxygen product stream 107 may then be cooled, compressed and used further downstream (not shown). Hot nitrogen rich stream 108 may have a temperature of between about 800 and 1000 C, and, depending on the amount of oxygen recovered in ion transport membrane 106, may also have oxygen present.

Hot nitrogen rich stream 108 may be mixed with hydrogen stream 125 and introduced into combustion chamber 109, in order to achieve the desired level of residual oxygen in stream 127, as well as increasing the temperature of this stream. Bypass stream 130 and/or heated stream 127, are combined into nitrogen stream 110, which is then introduced into exchanger reformer 111. Additionally, hydrocarbon stream 112 and steam stream 113 are introduced into exchanger reformer 111, wherein, utilizing the heat of stream 110, syngas stream 114 is produced. Combusted nitrogen rich residue stream 115 is high purity nitrogen stream, which after having at least a portion of its heat being utilized in exchanger reformer 111, is sent to air heater 104, to provide additional heat. After indirectly exchanging heat with compressed stream 103, cooled nitrogen stream 126 may be used downstream or other processes (not shown).

Syngas stream 114 is then introduced into water gas shift reactor 116, wherein shifted stream 117 is produced. Carbon dioxide rich stream 119 may then removed from shifted syngas stream 117 in carbon dioxide removal unit 118, solvent, such as amines. CO2 removal is optional. Purified shifted syngas stream 120 is produced by carbon dioxide removal unit 118.

Purified shifted syngas stream 120 is introduced into PSA 121, wherein tail gas stream 122 and hydrogen rich stream 123 are produced. A portion 125 of hydrogen rich stream 123 may be used in combustion chamber 109 as fuel, with the balance 124 being exported for use elsewhere. Tail gas stream 122 may contain unconverted CH4, and CO, and unrecovered H2 and may be made available for use as fuel.

Heat recovery from various streams such as syngas exit reformer, and shift reactor is not shown. The heat could be used for steam generation or heating of process streams. Water produced by the combustion of hydrogen and oxygen is recovered as purified N2 is cooled. Such condensate can be used to generate steam required for steam reforming.

Figure 2:
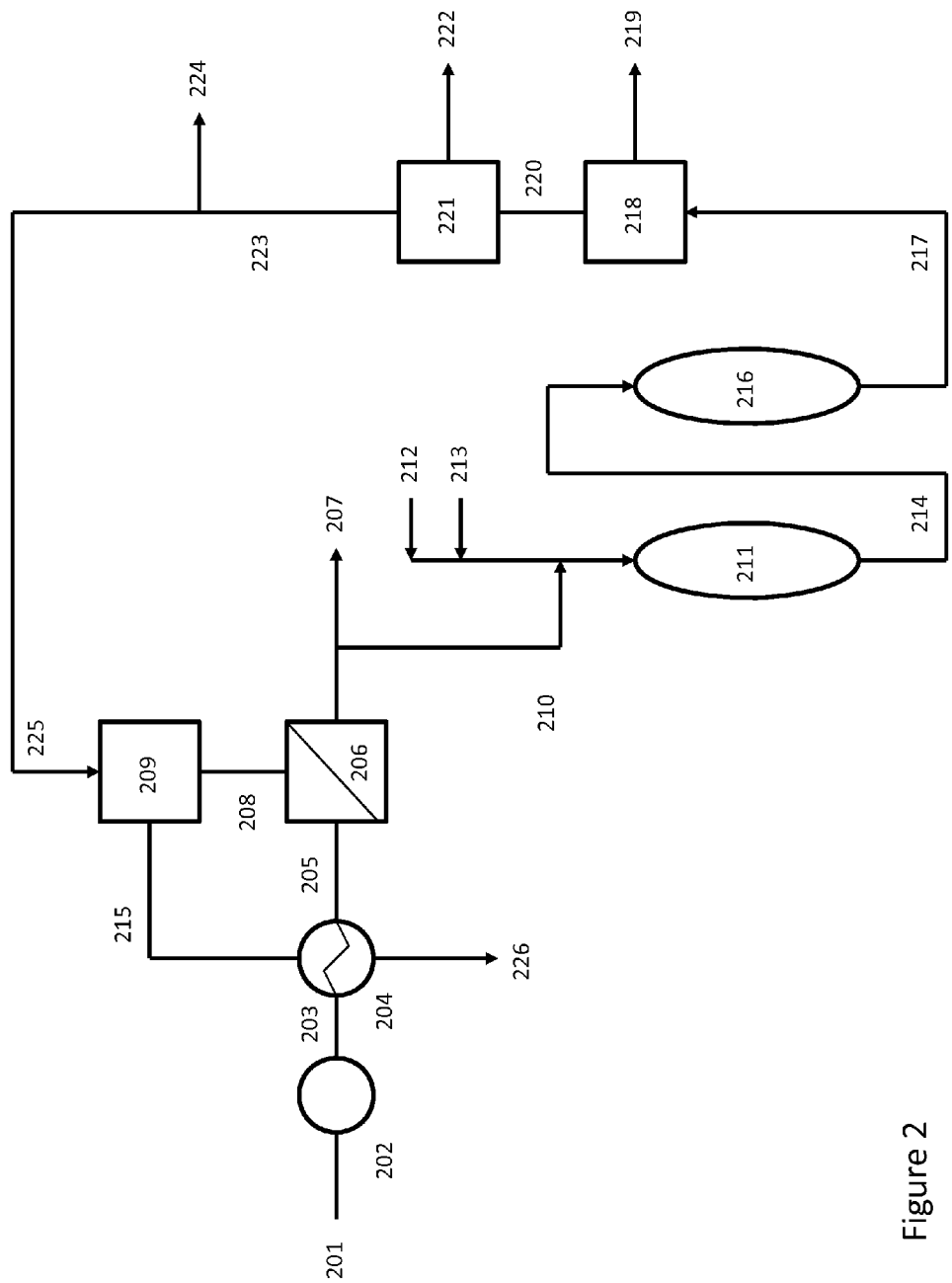
FIG. 2 is a schematic representation of one embodiment of the present invention.

Turning to FIG. 2, air stream 201 is compressed in compressor 202, thereby producing compressed stream 203. Compressed stream 203 is then heated by indirect heat exchange with purified nitrogen stream 215 in heat exchanger 204, thereby producing compressed, heated air stream 205. Heated air stream 205 may have a temperature of between 800-1000 C. Heated air stream 205 is introduced into ion transport membrane (ITM) 206, wherein oxygen product stream 207 and hot nitrogen rich stream 208 are formed. Oxygen product stream 207 may be at a pressure of between about 0.5 and 2.0 barA. Oxygen product stream 207 may then be cooled, compressed and used further downstream (not shown). Hot nitrogen rich stream 208 may have a temperature of between about 800 and 1000 C, and, depending on the amount of oxygen recovered in ion transport membrane 206, may also have oxygen present.

Hot nitrogen rich stream 208 is then mixed with hydrogen stream 225 and introduced into combustion chamber 209, in order to achieve the desired level of residual oxygen in stream 215, as well as increasing the temperature of this stream. Combusted nitrogen rich residue stream 215 is high purity nitrogen stream, which is sent to air heater 204, to provide additional heat. After indirectly exchanging heat with compressed stream 203, cooled nitrogen stream 226 may be used downstream or other processes (not shown).

A portion 210 of oxygen product stream 207 is combined with hydrocarbon stream 212 and steam stream 213 are introduced into autothermal reformer 211, wherein, at least partially utilizing the heat of stream 210, syngas stream 214 is produced.

Syngas stream 214 is cooled (not shown) then introduced into water gas shift reactor 216, wherein shifted stream 217 is produced. Carbon dioxide rich stream 219 may then removed from shifted syngas stream 217 in carbon dioxide removal unit 218 with solvents, such as amines. CO2 removal is optional. Purified shifted syngas stream 220 is produced by carbon dioxide removal unit 218.

Purified shifted syngas stream 220 is introduced into PSA 221, wherein tail gas stream 222 and hydrogen rich stream 223 are produced. A portion 225 of hydrogen rich stream 223 may be used in combustion chamber 209 as fuel, with the balance 224 being exported for use. Tail gas stream 222 may contain unconverted CH4, and CO, and unrecovered H2 and may be made available for use as fuel.

Heat recovery from various streams such as syngas exit reformer, and shift reactor is not shown. The heat could be used for steam generation or heating of process streams. Water produced by the combustion of hydrogen and oxygen is recovered as purified N2 is cooled. Such condensate can be used to generate steam required for steam reforming.

Figure 3:
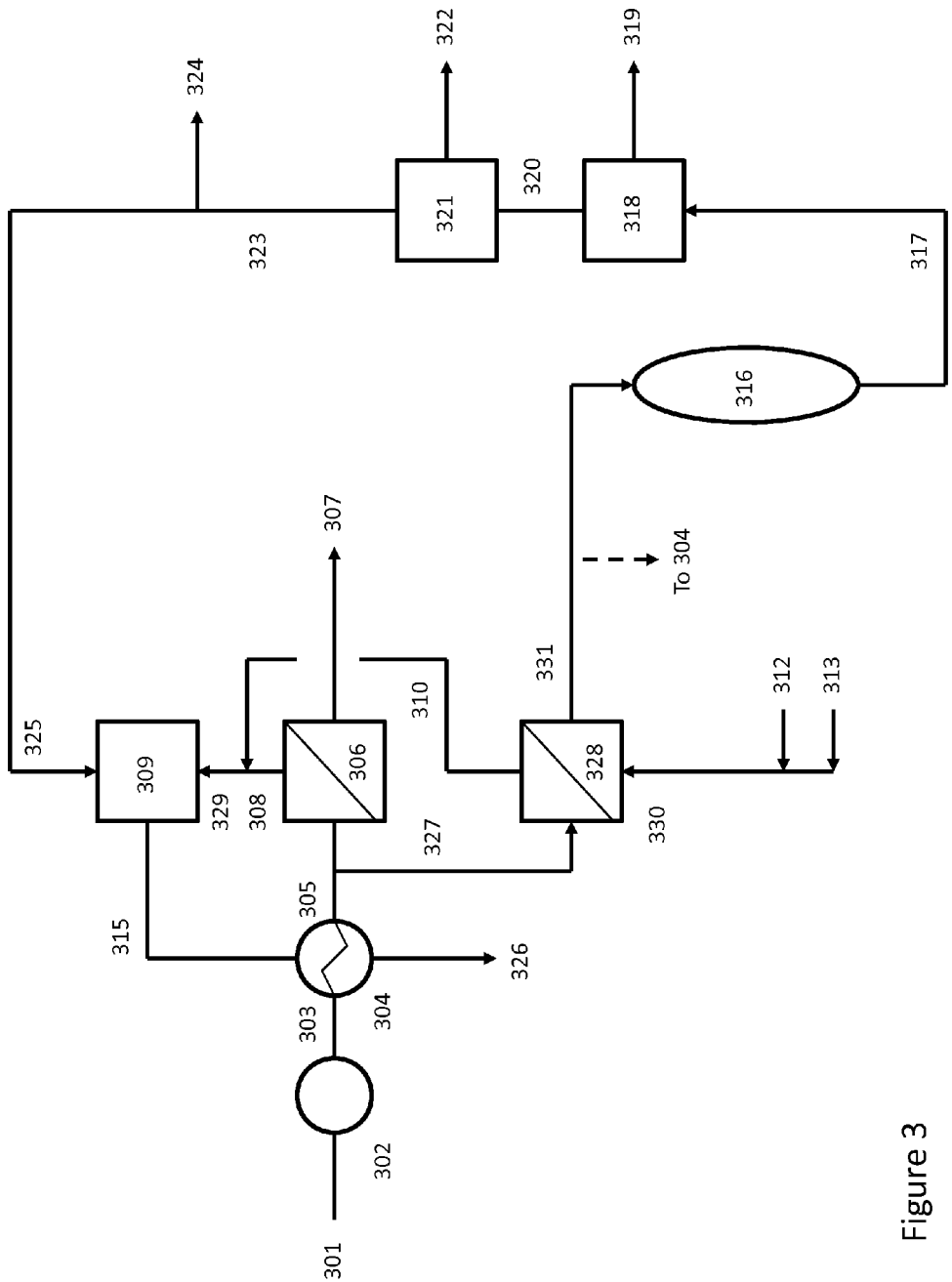
FIG. 3 is a schematic representation of one embodiment of the present invention.

Turning to FIG. 3, air stream 301 is compressed in compressor 302, thereby producing compressed stream 303. Compressed stream 303 is then heated by indirect heat exchange with purified nitrogen stream 315 in heat exchanger 304, thereby producing compressed, heated air stream 305. Heated air stream 305 may have a temperature of between 800-1000 C. Heated air stream 305 is introduced into first ion transport membrane (ITM) 306, wherein oxygen product stream 307 and first nitrogen rich stream 308 are formed. Oxygen product stream 307 may be at a pressure of between about 0.5 and 2.0 barA. Oxygen product stream 307 may then be cooled, compressed and used further downstream (not shown). First nitrogen rich stream 308 may have a temperature of between about 800 and 1000 C, and, depending on the amount of oxygen recovered in first ion transport membrane 306, may also have oxygen present.

First nitrogen rich stream 308 is then mixed with hydrogen stream 325, and second nitrogen rich stream 310, and introduced into combustion chamber 309, in order to achieve the desired level of residual oxygen in stream 315, as well as increasing the temperature of this stream. Combusted nitrogen rich residue stream 315 is high purity nitrogen stream, which is sent to air heater 304, to provide additional heat. After indirectly exchanging heat with compressed stream 303, cooled nitrogen stream 326 may be used downstream or other processes (not shown).

A portion 327 of heated air stream 305 is introduced to an ion transfer membrane reactor 328. At least a portion of methane 312 and steam 313 mixture stream 330 is introduced into the permeate side of the ion transport membrane reactor 328. The ion transport reactor 328 produces first syngas stream 331 and a second nitrogen rich stream 310. Second nitrogen rich stream 310 is combined with first nitrogen rich stream 308, to form combined nitrogen rich stream 229, which is then introduced combustion chamber 309. Stream 330 reacts with O2 permeating in second ion transport membrane reactor 328, generating first syngas stream 331, which may contain H2, CO, and CO2.

First syngas stream 332 is further combined with second part of steam stream 312 and second hydrocarbon stream 313 and is introduced into syngas reactor 311, wherein second syngas stream 314 is produced. Second syngas stream 314 is then introduced into water gas shift reactor 316, wherein shifted stream 317 is produced. Carbon dioxide rich stream 319 may then removed from shifted syngas stream 317 in carbon dioxide removal unit 318 with a solvent, such as amines. CO2 removal is optional.

Purified syngas stream 320 is introduced into PSA 321, wherein tail gas stream 322 and hydrogen rich stream 323 are produced. A portion 325 of hydrogen rich stream 323 may be used in combustion chamber 309 as fuel, with the balance 324 being exported for use. Tail gas stream 322 may contain unconverted CH4, and CO, and unrecovered H2 and may be made available for use as fuel.

Heat recovery from various streams such as syngas exit reformer, and shift reactor is not shown. The heat could be used for steam generation or heating of process streams. Water produced by the combustion of hydrogen and oxygen is recovered as purified N2 is cooled. Such condensate can be used to generate steam required for steam reforming.

The syngas reactor and ITM-2 can be integrated in various ways. The syngas reactor can be a separate vessel as shown in FIG. 3. Or the syngas reactor may have ITM tubes, with air on inside and natural gas and steam on the outside. The outside of the tubes have catalyst coating for reforming reaction.

Figure 4:
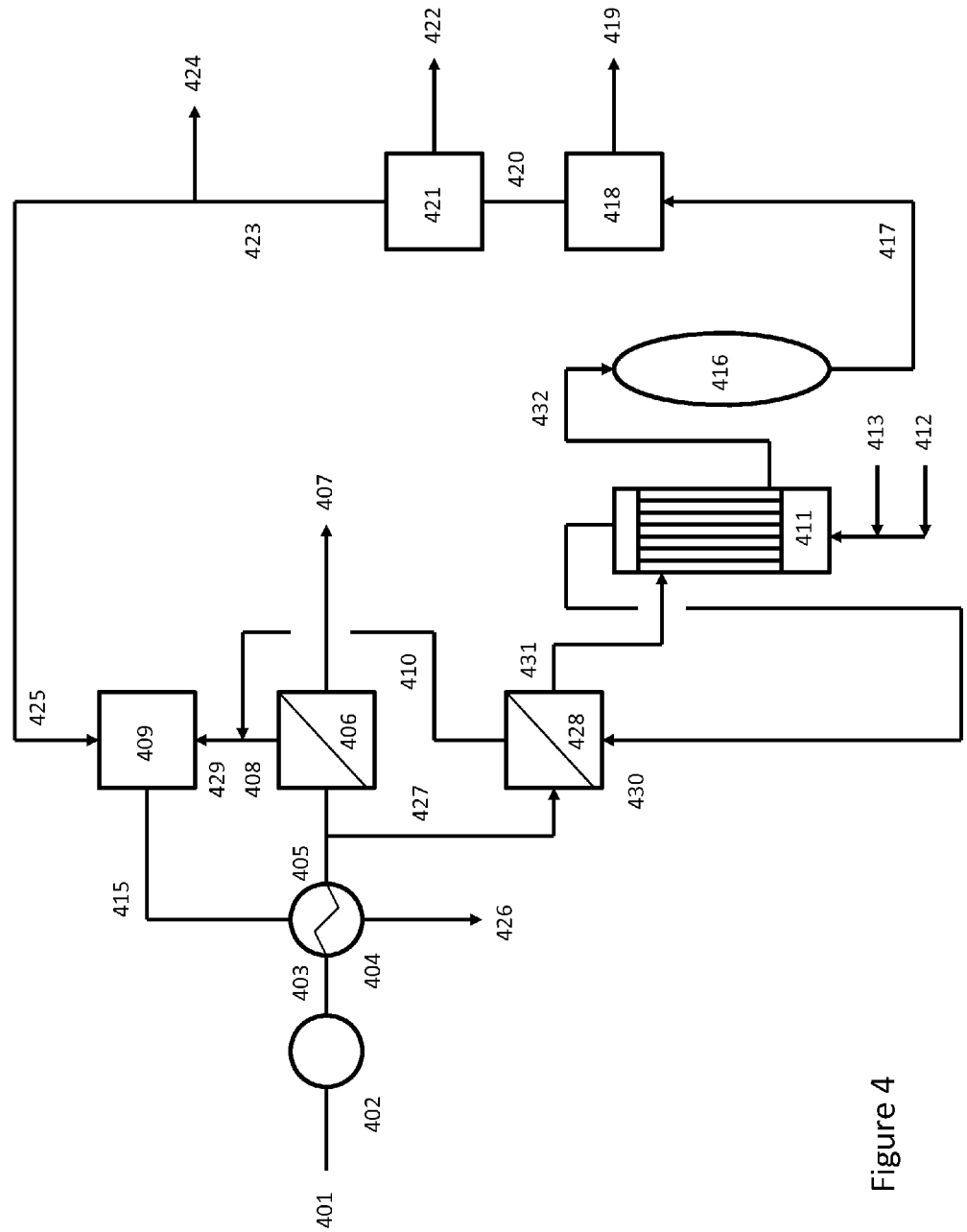
FIG. 4 is a schematic representation of one embodiment of the present invention.

Turning to FIG. 4, air stream 401 is compressed in compressor 402, thereby producing compressed stream 403. Compressed stream 403 is then heated by indirect heat exchange with purified nitrogen stream 415 in heat exchanger 404, thereby producing compressed, heated air stream 405. Heated air stream 405 may have a temperature of between 800-1000 C. Heated air stream 405 is introduced into ion transport membrane (ITM) 406, wherein oxygen product stream 407 and hot nitrogen rich stream 408 are formed. Oxygen product stream 407 may be at a pressure of between about 0.5 and 2.0 barA. Oxygen product stream 407 may then be cooled, compressed and used further downstream (not shown). Hot nitrogen rich stream 408 may have a temperature of between about 800 and 1000 C, and, depending on the amount of oxygen recovered in ion transport membrane 406, may also have oxygen present.

A portion 427 of heated air stream 405 is introduced to an ion transfer membrane reactor 428. At least a portion of methane 412 and steam 413 is introduced into the exchange reformer 411, thereby producing first syngas stream 430. First syngas stream 430 is introduced into ion transport membrane reactor 428. The ion transport reactor 428 produces second syngas stream 431 and a second nitrogen rich stream 410. Second nitrogen rich stream 410 is combined with first nitrogen rich stream 408, to form combined nitrogen rich stream 429, which is then introduced combustion chamber 409. Stream 430 reacts with O2 permeating in second ion transport membrane reactor 428, generating second syngas stream 431, which may contain H2, CO, and CO2.

Second syngas stream 431 is introduced into exchange reformer 411, wherein it provides at least a portion of the heat required for syngas production. Cooled second syngas stream 432 is then introduced into water gas shift reactor 416, wherein shifted stream 417 is produced. Carbon dioxide rich stream 419 may then removed from shifted syngas stream 417 in carbon dioxide removal unit 418 with a solvent, such as amines. CO2 removal is optional.

Purified syngas stream 420 is introduced into PSA 421, wherein tail gas stream 422 and hydrogen rich stream 423 are produced. A portion 425 of hydrogen rich stream 423 may be used in combustion chamber 409 as fuel, with the balance 424 being exported for use. Tail gas stream 422 may contain unconverted CH4, and CO, and unrecovered H2 and may be made available for use as fuel.

What is claimed is:

1. A method for the coproduction of oxygen, hydrogen and nitrogen using an ion transport membrane, the method comprising:

separating a compressed, hot air stream in an ion transport membrane, thereby producing a product oxygen stream and a hot nitrogen rich stream;

utilizing at least a portion of said hot nitrogen rich stream as a heat source for reforming a hydrocarbons stream, thereby producing a syngas stream and a warm product nitrogen stream; and separating said syngas stream into a product hydrogen stream and a carbon dioxide rich stream.

2. The method of claim 1, wherein at least a portion of the heat in said compressed, hot air stream is provided by said warm product nitrogen stream.

3. The method of claim 1, wherein said syngas stream undergoes a water-gas shift step, prior to the separation of the carbon dioxide rich stream and the separation of the product hydrogen stream.

4. The method of claim 1, wherein said product hydrogen stream is separated by means of a pressure swing adsorption process.

5. The method of claim 1, wherein at least a portion of said hot nitrogen rich stream is further heated in a combustion chamber.

6. The method of claim 5, wherein at least a portion of said product hydrogen stream is used as a fuel in said combustion chamber.

7. The method of claim 1, wherein said syngas reforming is performed in a steam methane reformer.

* * * * *